No. 691,958. Patented Jan. 28, 1902.
C. W. MILLS.
GAS SEPARATOR FOR DIGESTERS.
(Application filed Aug. 23, 1901.)
(No Model.)
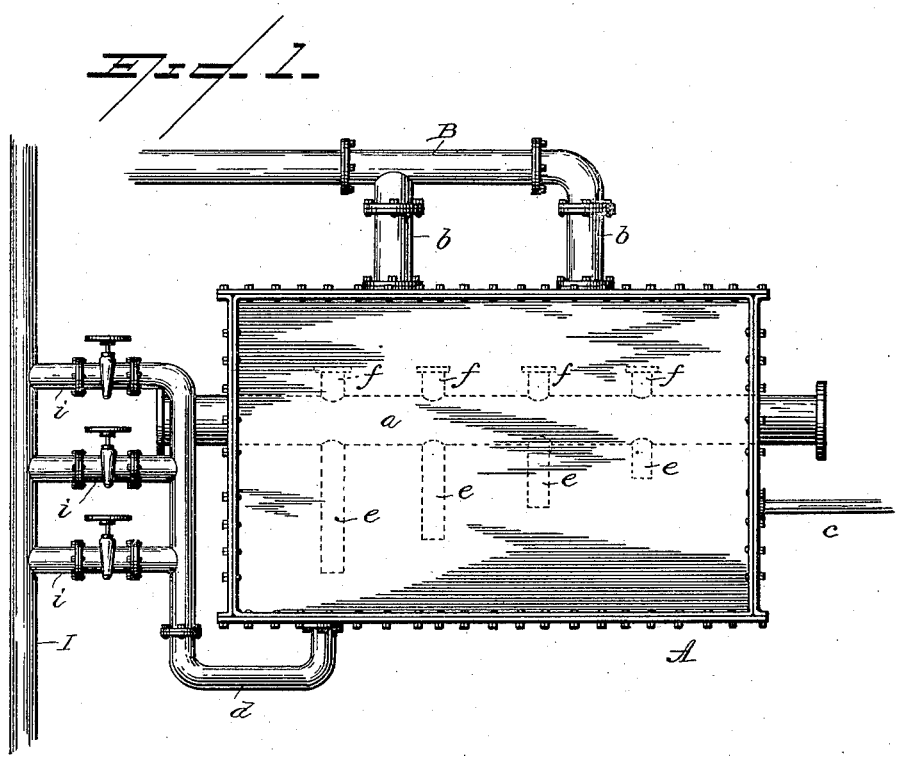
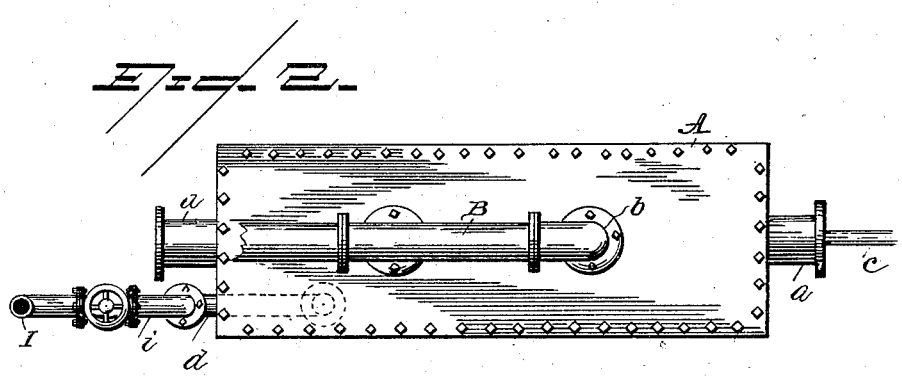
Witnesses:
Charles W. Mills,
Inventor
by
Attorneys

UNITED STATES PATENT OFFICE.

CHARLES W. MILLS, OF RUMFORD FALLS, MAINE.

GAS-SEPARATOR FOR DIGESTERS.

SPECIFICATION forming part of Letters Patent No. 691,958, dated January 28, 1902.

Application filed August 23, 1901. Serial No. 73,047. (No model.)

*To all whom it may concern:*

Be it known that I, CHARLES W. MILLS, a citizen of the United States, and a resident of Rumford Falls, in the county of Oxford and State of Maine, have invented certain Improvements in Gas-Separators for Digesters, of which the following is a specification.

The object of this invention is to provide an apparatus for cooling and separating the gas which is discharged from sulfite-digesters, whereby the gas and liquor are thoroughly separated and the purified gas conveyed to a reclaimer, while the liquor or waste is collected in the tank and discharged therefrom.

The apparatus consists of a closed tank having a horizontal inlet-pipe with branch discharge-pipes for the gas and liquor, outlet-pipes in the top of the tank for conducting the gas from the apparatus, combined with water inlet and discharge pipes, the latter extending from the bottom of the tank upward and provided with several valved branches at different elevations.

The following specification enters into a detail description of the invention, reference being had to the accompanying drawings and to letters thereon, which designate the different parts, and what I claim in the particular construction and combination is more specifically set forth in the appended claims.

In the drawings forming a part hereof, Figure 1 is a side elevation of a gas cooling and purifying apparatus constructed in accordance with my invention. Fig. 2 is a plan view of the apparatus.

Referring to said drawings, A designates the closed tank, which is made up of sheet-metal plates bolted together at their edges, the side and end plates being flanged, as shown, to receive the connecting-bolts. The plates may be either made of composite metal or of sheet-iron coated with lead on the inner side, so that the said tank will not be affected by the gas.

Extending horizontally through the tank A from one end to the other is an inlet-pipe $a$, through which the gas and liquor from the digesters are conveyed to the tank, and the said inlet-pipe is provided with a number of depending branch pipes $e$ and upwardly-projecting branch pipes $f$, the pipes $e$ discharging the liquor into a body of water in the tank, while the free gas escapes through the pipes $f$ into the upper part of the tank. Entering the top of the tank A are gas-outlet pipes $b\,b$, connected to a pipe or conveyer B, which leads to a reclaimer.

$c$ designates a water-inlet pipe, which enters one end of the tank at a point below the inlet-pipe $a$, and through this pipe a supply of water is furnished to the tank. At the opposite end of the tank from the water-supply pipe $c$ is a discharge-pipe $d$, extending from the bottom of the tank up one side thereof and is provided with lateral branch pipes $i$, arranged at different elevations and having valves $i'$. The branch pipes $i$ connect with a pipe I, which discharges the water into a sewer or other drain.

In the operation of the apparatus the tank is supplied with a body of water the level of which is determined by opening either one of the valved branch pipes $i$. The gas and liquor entering the pipe $a$ will discharge the free gas into the upper part of the tank through the branch pipes $f$, and the liquor entering the branch pipes $e$ will be discharged into the body of water in the tank, separating the gas therefrom, which will rise to the top of the tank and pass off with the free gas that escapes from the pipes $f$. Water is supplied to the tank continuously, so that the hot liquor coming in contact therewith will liberate the gas which it may contain, and this gas rising to the top of the water will pass off through the pipes $b$. The water not only serves to cool the gas, but also serves to separate the gas from the liquor and purify it. The liquor or waste passes off with the water through the discharge-pipe $d$. The depending branch pipes $e$ are of different lengths, the first pipe being the longest and the other shorter in succession, so that the liquor will not only be discharged at different depths, but also have a greater distance to travel before being subjected to the action of the water.

The apparatus is simple in construction, can be readily and conveniently regulated, and is practically automatic in its operation.

Having thus described my invention, what I claim as new, and desire to secure by Letters Patent, is—

1. In an apparatus for separating and cooling gas, the combination, of a closed tank having a gas-outlet pipe leading from its upper end, a horizontal gas-inlet pipe extending through the tank, and branch pipes extending from the top and bottom of said inlet-pipe the depending branch pipes entering a body of water; together with water inlet and discharge pipes, substantially as shown and described.

2. In an apparatus for separating and cooling gas, the combination, of a closed tank having a gas-outlet pipe extending from the top of the same, a horizontal pipe extending through the tank, discharge-openings in the top of said horizontal pipe, and branch pipes of different lengths depending from the bottom of said horizontal pipe, together with water inlet and discharge pipes, substantially as shown and for the purpose set forth.

3. In an apparatus for separating and cooling gas, the combination, of a closed tank having a gas-outlet, a horizontal inlet-pipe extending through the tank, discharge-openings in the top of the inlet-pipe, and branch pipes depending from the bottom of said inlet-pipe, the branch pipes being of different lengths; together with a water-inlet pipe, a discharge-pipe, and valved branch pipes at different heights connected to the discharge-pipe, substantially as shown and for the purpose set forth.

In testimony whereof I affix my signature in the presence of two witnesses.

CHARLES W. MILLS.

Witnesses:
BURT L. ROUNDS,
G. WILLARD JOHNSON.